Dec. 28, 1965  H. ZIEGLER  3,225,600
ELECTRICAL DIFFERENTIAL-PRESSURE METER
Filed June 28, 1963  2 Sheets-Sheet 1

INVENTOR
Horst ZIEGLER

Dec. 28, 1965   H. ZIEGLER   3,225,600
ELECTRICAL DIFFERENTIAL-PRESSURE METER
Filed June 28, 1963   2 Sheets-Sheet 2
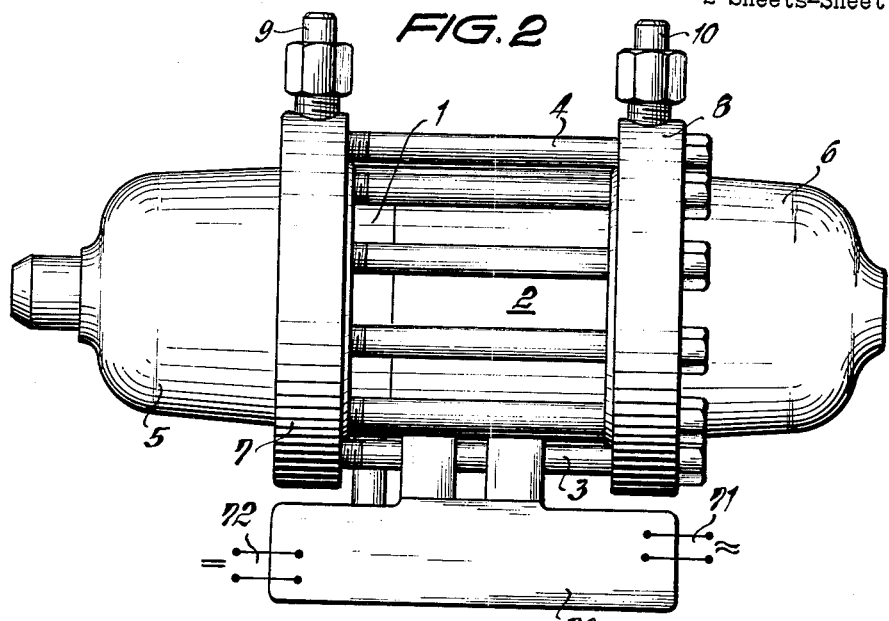
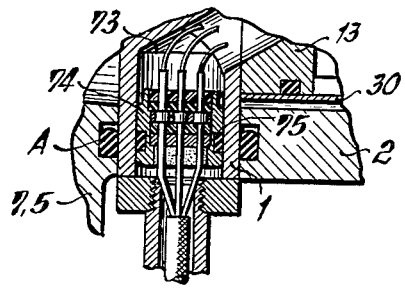
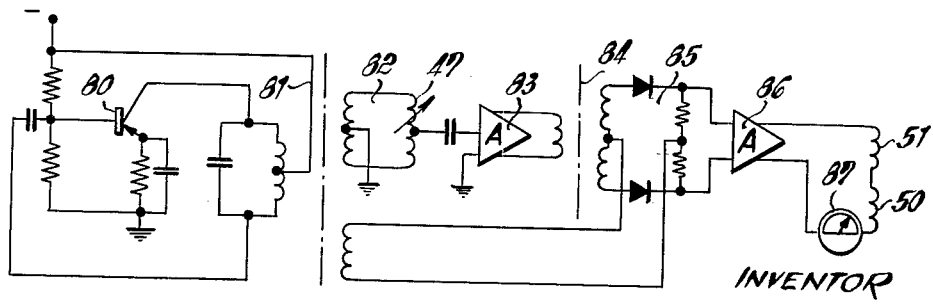
INVENTOR
Horst ZIEGLER United States Patent Office 3,225,600
Patented Dec. 28, 1965

3,225,600
ELECTRICAL DIFFERENTIAL-PRESSURE METER
Horst Ziegler, Berlin-Charlottenburg, Germany, assignor to Continental Elektroindustrie Aktiengesellschaft, Askania-Werke, Berlin-Mariendorf, Germany
Filed June 28, 1963, Ser. No. 291,502
10 Claims. (Cl. 73—407)

This invention relates to an electrical differential-pressure meter having a housing consisting of several parts. These parts are held together by screws and define a space which is divided into two pressure chambers by partitions clamped between the parts of the housing. It further comprises a differential-pressure measuring system consisting of two elastic elements which close off apertures in the partitions. The elastic elements are mechanically coupled by a connecting rod traversing the apertures. The force to be measured by this meter acts upon the said connecting rod. This force is measured electrically by means of a force compensating measuring means located within its own housing. That housing is sealed off from both pressure chambers, is located between the elastic measuring elements, and is traversed by the connecting rod. It has walls arranged transversely to the connecting rod and provided with openings traversed by said connecting rod. These walls serve as supports for the elastic measuring elements which seal the said openings.

Meters of this type are desirable for use as flow meters, especially in steam power plants, for piping subjected to high static pressures. They permit relatively accurate flow measurements at pressures up to about 600 times atmospheric.

It is known to build such an arrangement by dividing an elongated housing consisting of plural generally cylindrical portions into three adjoining chambers by means of two partitions placed transversely to the axis of the housing and clamped between the different portions of the housing. The partitions have apertures, each of which is closed off by a bellows on that side of the respective wall facing away from the central chamber. The bellows are rigidly connected with each other by a connecting rod which traverses the central chamber formed by the partitions and the housing. In the central chamber there are disposed portions of an electrical force compensating measuring means which compensates the force to be measured, corresponding to the differential-pressure between the two outer chambers of the housing and sensed through the medium of the connecting rod, by means of an electrically produced opposing force. The electrical current required to produce the compensating force then serves as a measure of the differential pressure. This system is often so arranged that the compensating force is proportional to the square of this current so that the current is proportional to the square root of the differential pressure.

Meters of this and similar form suffer from the defect that their measurement characteristics are subject to pressure and temperature responsive variations in zero readings and also to pressure and temperature dependent hysteresis phenomena. A not insignificant fraction of these error-producing influences is caused by compressional and tensional forces in the sections of the outer housing of the instrument, which act against the forces of the screws holding the housing together. These are transferred from the outer housing sections via the partitions which divide up the interior of the housing to the compensator, or rather to the connecting rod, thereby producing a pressure and temperature dependent displacement of these structural elements, which in turn causes errors in measurement.

In accordance with this invention it is therefore proposed to position the compensator housing entirely within one of the two pressure chambers of the meter and to so place that housing that one of its two walls disposed transversely to the connecting rod forms a partition separating the two pressure chambers.

In meters in accordance with the invention, the compensator housing can be relieved entirely of the pressure existing in the interior of the differential-pressure measuring means by completely filling with a liquid, such as silicon oil, the compensator housing as well as those portions of the differential-pressure measuring system which are in communication with that housing. Provisions can further be made to establish a pressure-communicating relationship between these fluid-filled portions of the meter and one of the two pressure chambers. This may be done, for example, by means of a bellows having an elasticity which is low compared to that of the elastic differential-pressure measuring means. Temperature-dependent volume changes of the liquid then have no effect on the measurement and the elastic differential-pressure measuring means is rendered completely independent of the pressure of the liquid.

A preferred embodiment of the invention is illustrated in the accompanying drawings wherein:

FIGURE 2 shows an exterior view thereof,

FIGURE 3 shows details of construction of a portion of the embodiment of FIGURE 1, and FIGURE 4 shows a schematic diagram of the electrical portions of the embodiment.

Figure 1:
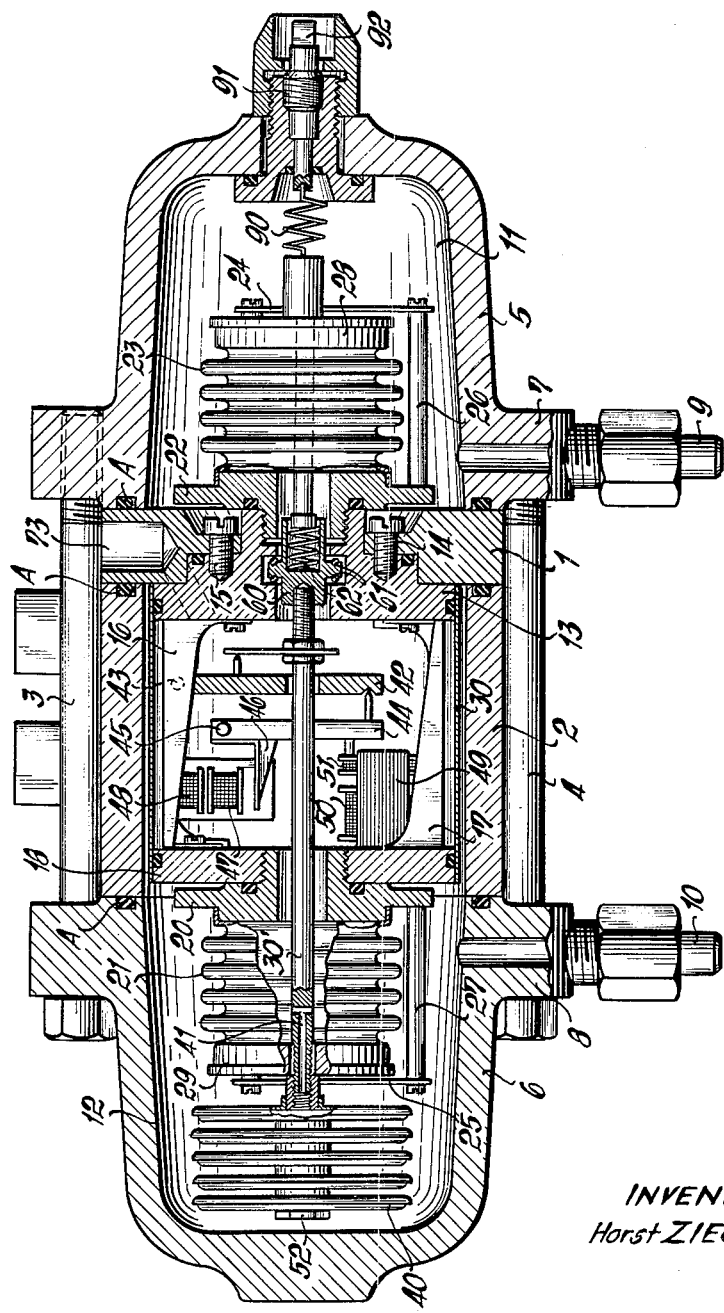
FIGURE 1 shows a longitudinal cross-section through such an embodiment.

Referring now to FIGURE 1, there is shown therein a disc-shaped base plate 1 having a central aperture. Base plate 1, together with cylindrical mid-section 2, is pressed against flange 7 of housing section 5 by means of bolts 3, 4, between two closed cylindrical end sections 5 and 6. Thus the housing consisting of sections 5, 7, 1, 2 and 6 is outwardly tightly enclosed. The individual housing sections are provided with suitable seals in the form of O-rings A made of material having rubber-like resiliency. Flange 7 of housing section 5 and flange 8 of housing section 6 are provided with pressure-coupling nipples 9 and 10 for connecting the differential-pressure meter to those points between which the difference in pressure is to be determined. Flanges 7 and 8 further serve to receive bolts 3, 4, which are disposed around the outside of the housing parallel to the longitudinal axis.

The disc-shaped base plate 1 separates the interior of the housing consisting of elements 5, 1, 2 and 6 into two pressure chambers 11 and 12. A second base plate 13 is attached to base plate 1 by means of screws 14 and 15 in pressure chamber 11. This second base plate is coupled to two spacers 16 and 17, which, in turn, serve as mounts for a third base plate 18. Disc-shaped base plate 18 is provided with a threaded central aperture. Screwed into the threads of this aperture is an externally threaded protrusion from a bearing plate 20, which serves as support for bellows 21. The interior of this bellows is sealed off from pressure chamber 12 at bearing plate 20.

Base plate 13 has a centrally located protrusion pierced by an opening. This protrusion extends through the aperture in base plate 1. In threaded engagement with plate 13 is a bearing plate 22, which serves as support for bellows 23. Bellows 21 and 23 are connected to stand-offs 26 and 27 by membranes 24 and 25 of low elasticity. The stand-offs, in turn, rest on bearing plates 20 and 22. In this way the bellows are restrained from lateral deflection.

The heads 28 and 29 of bellows 21 and 23 are connected with each other by connecting rod 30', which passes through the interior of the bellows, as well as the apertures in base plates 18, 1 and 13 and those in bearing plates 20 and 22.

A cylindrical member 30 fits around and extends between the two base plates 13 and 18, sealing off the space enclosed by this member and the two base plates from pressure chamber 12. Sealing is effected by means of sealing rings of rubber-like resilience mounted in the outer periphery of base plates 13 and 18. An additional seal is provided between base plate 18 and bearing plate 20. Pressure chamber 11 is also provided with a pressure-tight separation from pressure chamber 12 by means of a seal of rubber-like resilience mounted between base plates 1 and 13 and a seal of similar characteristics between bearing plate 22 and base plate 13.

A bellows 40, having low elasticity compared to bellows 21 and 23, is screwed to the portion of connecting rod 30′ extending through the head 29 of bellows 21. Connecting rod 30′ has a central passage 41, which puts the interior of bellows 40 into communication with the interior of bellows 21. Inside the housing formed by base plates 1, 13 and 18 and cylindrical member 30, there are levers mounted on supports between base plates 13 and 18. These levers serve to transmit the force to be measured, which can be sensed through its action upon connecting rod 30′. A first simple lever 42 pivots about axis 43 and transmits the force exerted by an arm (which is rigidly connected to connecting rod 30′) to a second simple lever 44, pivoting about axis 45. Lever 44 has an aluminum vane 46 whose spacing from coil 47 varies in response to rotation of lever 44 about its axis 45, thereby varying the resistance of that coil to the flow of alternating current. A source of 300 kc. signals supplies coil 47, as well as a second coil 48, both of which form part of an electrical bridge circuit. When the meter reads zero, the bridge is balanced. When a pressure difference exits betwen pressure chambers 11 and 12, this balance is upset and a direct current is produced, which is supplied to an electromagnet 49. How this takes place is explained in more detail hereinafter. The electromagnet has a fixed winding 50 and a movable winding 51 displaceable within the air gap of the magnet. The movable winding 51 is attached to lever 44. Windings 50 and 51 are connected in series with the above-mentioned direct current circuit, so that a force is exerted upon movable winding 51 which is proportional to the square of said direct current.

The head of bellows 40 is equipped with a sealable nipple 52. The opening which results from uncapping of this nipple is utilized to introduce into the interior of bellows 23, 21 and 40 and the compensator housing formed by elements 1, 13, 30 and 18, silicon oil (or some other oil which is electrically non-conducting and sufficiently incompressible) in sufficient quantity to fill these interior spaces completely. Nipple 52 is then recapped.

To prevent damage to bellows 21 and 23 from unidirectional overpressure in pressure chambers 11 and 12, the device is provided with an overpressure protector. This comprises a generally cylindrical body 60, having a circumferential ridge extending into a recess in base plate 13. The outer periphery of the ridge is provided with two seals 61 of rubber-like resilience. The portion of connecting rod 30′ which traverses bellows 23 is supported on body 60 by a spring 62. This spring is sufficiently stiff that its spring characteristics do not affect the measurement. If within pressure chamber 11, which serves as the high pressure chamber of the differential-pressure meter, there develops an overpressure harmful to the bellows, then the bellows is first compressed to the point where the rubber-like seal 61 seals off the interior of the bellows from the interior of the compensator housing. Thereafter spring 62 comes into play. A shoulder is provided in the displacement path of the spring-actuating connecting rod portion to limit the compression of the spring in response to the displacement demands of bellows 23 to a predetermined maximum value. If excessive overpressure develops in pressure chamber 12, the interior of the compensator housing and bellows 21 likewise becomes separated from the interior of bellows 23 by rubber-like seal 61.

Not all electrical components associated with the compensator are located within the compensator housing.

As may be seen from FIGURE 2, a box 70 is attached to the cylindrical housing 2. This box contains the electrical components associated with the apparatus. The box extends generally lengthwise of the apparatus and has terminals 71 by means of which it is supplied with alternating operating potentials. By means of terminals 72 a direct current can be derived from box 70. This direct current varies from, say, 0 to 50 ma. in response to variations in the differential pressure to be metered. Electrical connections between box 70 and the interior of the meter are made via an aperture 73 in base plate 1. A pressure-tight electrical lead-through can be inserted in aperture 73. The details of this lead-through are shown in FIGURE 3. As shown therein, a hollow cylindrical body 74 is inserted into aperture 73. Inside this body is a sandwich-like assembly of alternate layers of plastic and metal, together with sealing plates of rubber-like elasticity, which enables the electrical conductors to pass through the body 74 in pressure-tight fashion. The outer periphery of body 74 is sealed against base plate 1 by an O-ring 75 and the aperture 73, itself, is mechanically closed off from the outside by a shutter 76 which may, for example, be screwed to the base plate 1. Sleeve 74 bears against member 76 when subjected to a difference in pressure between the interior of the meter and the outside.

FIGURE 4, to which reference may now be had, shows a 300 kc. oscillator 80 which supplies, via signal transfer means 81, a bridge circuit 82. The bridge circuit also includes coil 47. Unbalance voltages produced by the bridge are amplified in amplifier 83 and applied via signal transfer means 84 to a phase-sensitive detector 85, which is supplied with a phase reference signal from oscillator 80 via signal transfer means 81. The detector 85 which, in the embodiment illustrated, takes the form of a balanced modulator, produces at its output a unidirectional potential which is supplied to a power amplifier 86. This amplifier produces a unidirectional current which flows through the series connected fixed and movable windings 50 and 51 of electromagnet 49. In series with the electromagnet windings is an indicator 87, or some other form of current-responsive device, such as a regulator, recorder, or counter, or even several such instruments in combination.

Referring again to FIGURE 1, there is shown also a zero-setting spring 90, which is adjustable by means of a pin 91 which penetrates the housing in pressure-tight fashion. This pin can be screwed into or out of the housing from the outside by means of square stud 92. Spring 90 is supported between the end of pin 91 and the head of bellows 23.

By adjustment of the tension of spring 90 all parts of the electrical compensator are set to zero, so that, when the pressures in chambers 11 and 12 are equal, no current flows in the output of amplifier 86. If the pressure in chamber 11 increases, a force corresponding to the difference in pressure between the two pressure chambers is exerted upon connecting rod 30′. This force is transmitted by the lever system comprising elements 42, 43, and 44 and causes a displacement of vane 46 and a corresponding variation in the resistance of element 47. At the output of modulator 85, a corresponding error signal is then produced, which in turn causes a corresponding current to flow in the output circuit of power amplifier 86. This latter current flows through the windings of electromagnet 49, which responds by producing an opposing force transmitted to the connecting rod via the lever system and compensating for the force to be measured. The displacements of the connecting rod 30′ which occur during this process are small, amounting in practice only to a few hundredths of a millimeter, so that the elastic limits of the bellows are not exceeded.

The invention is not limited to the use of bellows. Instead of bellows, diaphragms can also be used. In addition, the measurement can also be performed with apparatus exhibiting a linear, rather than a square-law characteristic. In the latter case, electromagnet 49 is replaced by a system of permanent magnets, or else the fixed winding 50 of electromagnet 49 is excited by a unidirectional current of fixed amplitude. These and other modifications of the invention will readily occur to those skilled in the art without departing from the inventive concept set forth herein. Accordingly, I desire that concept to be limited only by the appended claims.

I claim:

1. Electrical differential-pressure measuring means comprising: a multipart housing having an interior divided into two pressure chambers by means of housing parts held together by screws and a partition clamped between said parts pressure coupling means communicating with said chambers; a differential-pressure measuring system sealing off an aperture in said partition, said system including two elastic elements and a connecting rod traversing said aperture and mechanically coupling said elements, any force to be measured acting upon said rod being electrically measured by means of force compensating measuring means, said last-named means being located within said multipart housing between said elastic elements in its own separate housing sealed off from said pressure chambers and traversed by said connecting rod, said separate housing having partitions provided with apertures traversed by said connecting rod, said partitions being disposed transversely to said rod and serving as terminations for said elastic elements, said elements covering said apertures, said separate housing being located entirely within one of said pressure chambers and one of its said partitions serving to separate said pressure chambers from each other.

2. Apparatus according to claim 1 characterized in that said one partition of said separate compensator housing comprises two housing comprises two individual plates, one of said plates being clamped between two parts of said multipart housing and the other of said plates being attached to said one plate and having said force compensating measuring means mounted thereon.

3. Apparatus according to claim 1 further characterized in that the space enclosed by said compensator housing and said elastic elements is substantially completely filled with liquid.

4. Apparatus according to claim 3 further characterized in that the interior of said compensator housing is in pressure-communicating relationship to one of said pressure chambers.

5. Apparatus according to claim 4 further comprising an additional elastic element disposed coaxially with respect to said first-mentioned elastic elements and on the side of one of said first-mentioned elements away from said separate compensator housing.

6. Apparatus according to claim 5 characterized in that said connecting rod has an interior passage by means of which said additional elastic element communicates with the interior of said compensator housing.

7. Apparatus according to claim 6 characterized in that said first-mentioned elastic elements are respectively mounted on separate supports, said separate supports being detachably mounted on said partitions of said compensator housing.

8. Apparatus according to claim 2 characterized in that said plate clamped between housing parts is provided with a passage extending radially outward with respect to the orientation of said connecting rod, said passage containing a pressure-tight lead-through through which the interior of said compensator housing communicates with electrical apparatus located outside said multipart housing.

9. Apparatus according to claim 8 further comprising electrical elements located outside said multipart housing and cooperating with elements contained within said compensator housing, said outside elements being enclosed in a container extending parallel to said multipart housing and being attached to said last-named housing.

10. The apparatus of claim 1 characterized in that said force compensating measuring means comprises means enclosed within said compensator housing for sensing the position of said connecting rod and electro-magnetic means for developing a force compensating for the force to be measured by said differential-pressure measuring means, and further characterized in that said sensing means comprises an inductive resistance connected into a bridge circuit supplied with signals from a high frequency source, unbalance-indicative signals from said bridge being supplied via a phase-sensitive detector means to a D.-C. amplifier and the output of said amplifier being supplied to said electromagnetic means.

No references cited.

LOUIS R. PRINCE, *Primary Examiner.*